Aug. 14, 1923.

V. GIL-DELGADO 1,465,125

RESILIENT WHEEL

Filed March 31, 1921

4 Sheets-Sheet 4

INVENTOR

V. Gil-Delgado

Atty.

Patented Aug. 14, 1923.

1,465,125

UNITED STATES PATENT OFFICE.

VICENTE GIL-DELGADO, OF MADRID, SPAIN.

RESILIENT WHEEL.

Application filed March 31, 1921. Serial No. 457,275.

*To all whom it may concern:*

Be it known that VICENTE GIL-DELGADO, subject of the King of Spain, residing at Madrid, 26 Calle de Serrano, Spain, has invented certain new and useful Improvements in Resilient Wheels, of which the following is a specification, reference being had therein to the accompanying drawing.

This invention relates to an improvement of a resilient vehicle wheel.

According to the present invention the resilient cushion is mounted directly on the periphery of the central or hub portion of the wheel and bears on the inner periphery of a box shaped intermediate rim the sides of which are constituted by the two side plates connected to the outer rim, the hub portion, resilient cushion, and outer rim lying all substantially in the plane of the wheel.

Another feature of the present invention consists in the provision, in a wheel of the kind in question of means whereby the outer rim can make axial displacements in both directions relatively to the intermediate rim, this means being thus quite independent of the means for permitting eccentric movements of the axle relatively to the periphery of the wheel.

The invention also comprises various other features hereinafter described and pointed out in the claims, and which are here briefly referred to as means for rendering the outer rim or tread renewable, friction boxes in slots in the hub portion, and side plates, a formation of the side plates whereby they form guides for the hub portion, and keys for guiding the axial displacement between the outer and intermediate rims.

Figure 1:
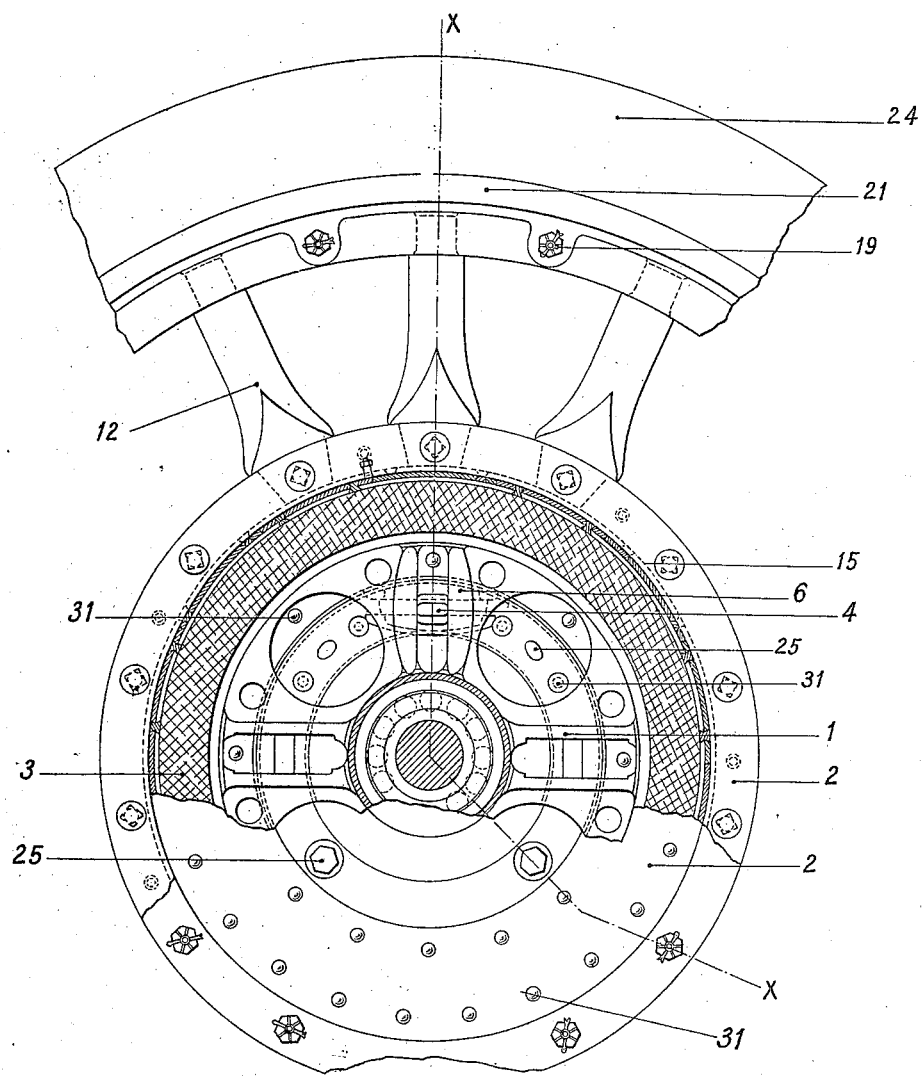
Figure 2:
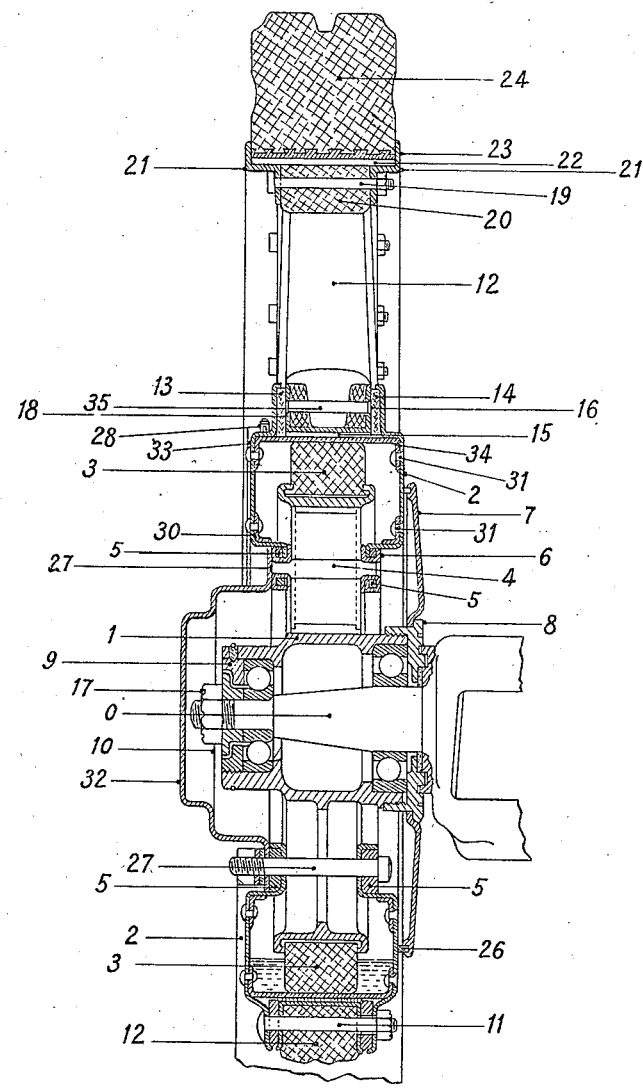
Figure 3:
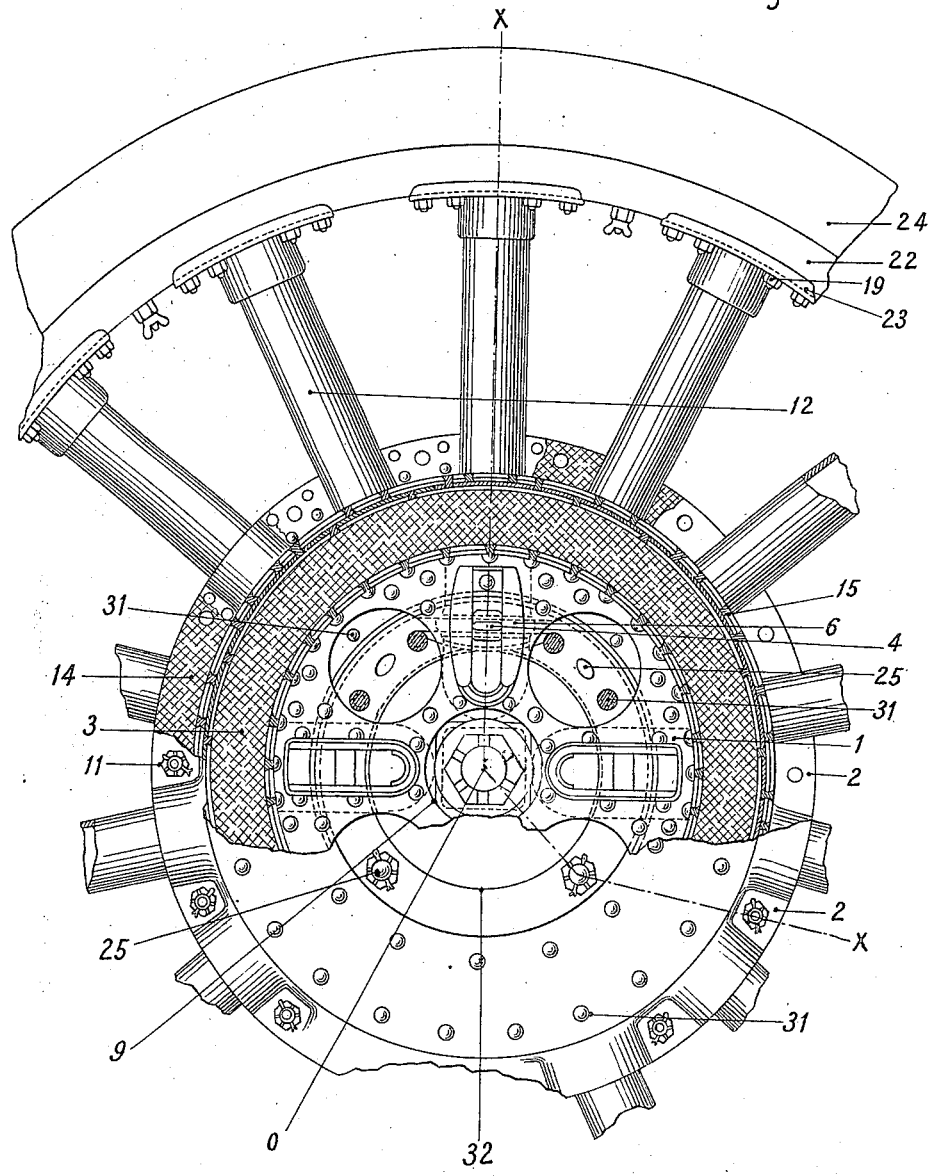
Figure 4:
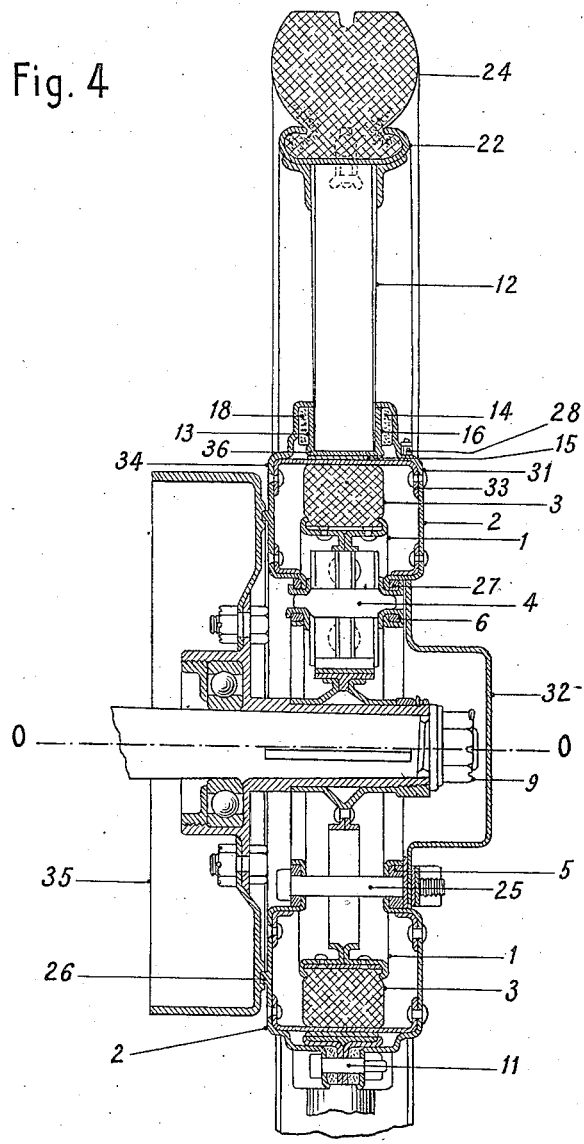

The accompanying drawings illustrate two constructions of wheel according to the invention, Figures 1 and 2 being a partial side and end elevation respectively of a wheel having wooden spokes and Figures 3 and 4 similar views of a wheel with tubular steel spokes.

Figures 2 and 4 are also sections on the line 2—2, and 4—4 of Figures 1 and 3, the line of the section being irregular so that the components of the central parts of the wheels may be better appreciated.

The wheel comprises two systems of parts, one for absorbing shocks in the direction perpendicular to the axle, and the other for absorbing shocks in both directions parallel to the axle.

The first of the systems referred to comprises a central or hub portion 1 provided with four slots 1' on two perpendicular diameters and a rim 2' in which a small solid rubber cushion 3 is lodged, which is sufficient in the wheels according to this invention to yield a resiliency equivalent to that of wheels with pneumatic tyres. Four circular equidistant holes 3' are formed in the hub-portion. In the hub proper are placed ball-bearings 8' which are held in position by an outer nut 9 and an inner nut 8, screwed on to the hub portion.

The intermediate rim is formed of two stamped plates 2, provided with stiffening rings 5, 30, 33 and 34 riveted to the same at places where greater strength is required. The said plates are each provided with four slots 4' on two perpendicular diameters.

Four bars 4 the ends of which are smaller than the middle portion are mounted each with its middle portion engaging one of the four slots in the part 1, and its ends in the corresponding slots in the plates 2.

Eight U-shaped friction boxes or wear receiving elements 6 are provided in the slots of each of the plates 2, two being associated with each of the slots in the plate, and eight boxes of similar form but different dimensions are fitted into the slots of the hub portion 1, two associated with each slot. The four bars 4 are made to slide freely within the interchangeable friction boxes referred to.

A ring 34 of angular section is riveted at 31 by its side flange to the internal face of one of the plates 2 and the end of the peripheral part of the ring rests on the edge of a ring 33 parallel to the flange of the ring 34, the ring 33 being riveted to the opposite plate 2.

The second of the systems referred to comprises resilient rings 14, 18 of rectangular section which lodge between extensions of the plates 2 forming the intermediate rim to which the spokes are attached, and flanges 16, 13, the former of which forms the side of an L-shaped ring. The flanges 16, 13 are held in place with the aid of rivets 35 riveted at both ends and arranged between the spokes and passing through the flanges. The inner face of the horizontal portion of ring 16 and the outer face of ring 34 have a sliding and guided interfit through the provision of alternate interfitting projections 15, part on the ring 16 and part on the ring 34.

The outer dowels of the wheel spokes 12 are fitted into the external rim 20, and the inner dowels into the intermediate rim which is stiffened by the rings 16 and 13. A hoop 22 is shrunk on the rim 20 and a solid tire 24 of ordinary type with a grooved fitting attachment 23 is pressed on the rim 22 and secured in place by two rings 21 of double angular section attached to the lateral faces of the rim 20 by bolts 19 and nuts and split pins.

The connection of the two wheel portions described is effected by means of four bolts 25 which pass through the centre of the holes 3' which are drilled equi-distantly in the hub portion 1. The bolts are oval in shape and hold the wheel hub interiorly by binding the stiffening rings 5 lodged in circumferential grooves in the side plates 2. The inner walls of these grooves are in contact with and guide the part 1 and a spring pressure washer 25' is provided on each bolt. There are also provided bolts 11 which pass through the plates 2 at that part of the latter which projects beyond the ring 34 and through the two rubber washers 14 and 18, the stiffening rings 13 and 16 and through the centres of the dowels of the spokes 12. 32 is an enlargement of the outer plate 2, forming a hub cover.

The driving effort from the motor to the wheel is transmitted through the cardan system to the axle O and the hub of the hub portion 1 by means of keys or by means of a squared or hexagonal portion on the axle or in any known suitable manner.

The wheel brakes are fitted in the usual way, the brake-drum 35 (Figure 4) for instance, being fixed to a turned over edge of the hub portion by bolts and nuts.

The lubrication of the two systems which is accomplished by means of a special lubricant to which rubber is impervious, is effected by means of an oil-cup or lubricator 28, Fig. 4, which passes through the exterior plate 2 of the wheel and the ring 34. When the lubricant is poured into this cup it falls into the casing formed by the two plates 2, the ring 34, the hub-cover 32 and the mud-guards 7; it cannot escape from the wheel because the latter is provided with a washer joint 27 placed between the base of the hub-cover 32 and the outer plate 2 at the point corresponding to the ring 5, and with a leather quadrangular washer 26, placed on the mud-guard 7 in a groove provided in this piece and which engages by friction the outer face of the plate 2 on the inner side of the wheel; this description applies to the front wheels of a vehicle, and with respect to the driving wheels the arrangement is similar except as regards the quadrangular washer 26 referred to, which engaging the said plate 2 by friction in the same way, is nevertheless, fitted in a groove provided on the face of the brake-drum which bears upon the said plate 2, as shown in Fig. 4.

The ring 34 is provided with several holes 34' drilled in the part which coincides with the washers 14 and 18, through which the lubricant passes from the interior to that part which constitutes the second system described, thus easing the movement of the keys 15, its escape being prevented by the previously described washers 14 and 18 which are initially of greater width than the space they occupy, and which whilst providing lateral elasticity, serve also as a joint for the pieces to which as explained they are fitted. The lubrication of both systems is therefore effected through the same aperture 28, from the outside of the wheel, and without its being necessary to dismount any of the pieces, which are thus lubricated by a continuous oil-bath during the revolutions of the wheel.

The action of the wheel mechanism in absorbing lateral strain will now be described. In the wheel of my prior specification no provision was made for absorbing the same. Since there exist, however, strains which operate in one sense or the other and exercise lateral efforts upon the wheels, more especially when rounding curves or during sharp turns, forcing the wheels to resist centrifugal force which tends to deflect the course of the vehicle, it is necessary to provide means which absorb the said effects, so as to increase the resisting power of the wheel and of the road-tyres.

In the description of the pieces which compose the wheel, it will be noticed that they form, in their manner of fitting together two completely distinct parts or sections:— the first comprising the tread or road tyre, coupling rings and screws for fixing the same, a hoop, outer rim and spokes, and the second the intermediate rim, stiffening rings and rivets for the latter, side plates, a ring of angular section, the bearing cover, and the remaining pieces composing the wheel. Also the first of the parts named is free to move laterally between the two plates 2 at the point of their circumference, because the intermediate rim, including its stiffening rings, is narrower in width than the distance between the two plates, and neither the screws 11 which pass through it, nor the keys 15 which are riveted to the stiffening rings, prevent this movement, being narrower than the distance between the stiffening pieces, nor the two rubber washers 14 and 18 which are also traversed by the screws 11. It will thus be seen that the action of the parts is simple. If the periphery can move laterally, it is obvious that on lateral stress occurring, the second part above mentioned will remain fixed, and the periphery or first part will deviate either to left or right according to the direction of the strain, this being absorbed by the two washers 14 and 18, according to the direction of the strain, checked by the screws 11, this effect being brought about by the lateral sliding of the keys 15. The keys 15 and the screws 11 prevent loss of tractional effort and brake action.

In the wheel shown in Figures 3 and 4, the upper part of each one of the spokes is lodged in a piece of tubular form, the base or seating 23 of which is fitted exteriorly to the rim 22, constituting mechanically a clamp. These clamps are fastened to the rim 22 by means of rivets, in which case they are permanently fixed to the rim or by means of bolts 19 running through the rim and the clamp referred to. This latter method permits of the rim 22 and tyre 24 being changed for another rim and tyre.

By unscrewing the nuts of the bolts referred to, the rim and tyre are thus freed from the wheel, and by sliding each clamp down its corresponding spoke, the rim and tyre can be separated. By placing another rim and tyre in the position vacated by that removed, then sliding up the clamps until they touch the wheel rim, the nuts merely have to be screwed onto their screws in order to complete the change.

The pressure of the solid tyre 24 on the rim 22 keeps the screws with their semispherical heads in their places in the said rim, whether the latter be mounted on the wheel or not. The tubular steel spokes have their lower or inner ends lodged in two equal undulated rings 16 and 13, the lower seatings of which are riveted to a ring 36 and projections 15. The circumferential part of the plates 2 which projects beyond the ring 34, is also undulated in form; these undulations correspond to those of the pieces 13 and 16. The ring 36 may be cast so as to form a single piece with one of the rings 13 or 16, but in the same shape as described.

Wheels built with tubular spokes possess also the advantage that all their pieces can be pressed or stamped out, although they may also be of cast metal, and provided also with an ordinary type of rim with double flanges 22, the tyre 24 requiring no strengthening. The shape shown in the drawing (see Figure 4), can thus be adopted, fitted with canvas only in the parts which engage with the flanges, or provided throughout its section or a part of the same, with canvas vulcanized to the rubber, or with chrome-finished leather correspondingly riveted.

In other details, these steel wheels do not differ essentially from those constructed of wood, as considered in the description preceding. The keys 15 may also be substituted in both constructions by undulations effected in the ring 36, which correspond with others of small size stamped in the ring 34, and in wheels with wooden spokes in the ring 34 mentioned and in the strap 16.

For the better understanding of this invention, two sectional elevations of each type of wheel are shown. In Figures 1 and 3, the external plate 2 and the hub cover 32 are seen in section, so that the details of the internal pieces of the wheel hub or central nucleus of the wheel may be examined; such pieces as the ball collar, the hub portion 1, bars 4, resilient cushion 3 and friction boxes 6, which are lodged in the sides of the slots of the hub portion, those of the plate on the other side of the wheel being indicated by dotted lines, as well as the slot of this latter plate where the opposite end of the bar 4 is lodged.

Although the sets of slots are four in number as described, between them forming a cross, each of the bars 4 corresponding to each of the four sets of slots, each set consisting of two slots, one in each plate and another one of those provided in the hub portion, the four latter have not been shown in order that the slots in the hub portion may also be seen without the two friction boxes of the opposite plate 2, and so that the structure of the external plate 2, the hub cover 32 and all the screws which hold the nucleus together may be examined.

Since the first system is distinct from the second, as has been made clear in the description, it is evident that gravitational and lateral strains are controlled independently.

The perfection of both system, their independence and the elasticity of the tractive effort, the fact that the parts composing the wheel may all be made of stamped metal, and the additional strength obtained in the same by the adoption of U, T, and double T-shaped steel plates, and the fact of there being no pneumatic tyre, produce the many advantages.

Having now particularly described and ascertained the nature of my said invention and in what manner the same is to be performed, I declare that what I claim is:

1. A resilient wheel, including an inner rim having a resilient cushion mounted thereon, an intermediate rim having its inner periphery engaging the cushion, an outer rim, and means for mounting the outer rim on the intermediate rim, permitting a relative axial movement between the rims.

2. A resilient wheel, including a hub portion, a resilient cushion mounted on the periphery of said hub portion, an intermediate rim having its inner periphery engaging said cushion, an outer rim, and means for mounting the outer rim on the inner rim, permitting axial movement of the outer rim and including resilient elements for cushioning said axial movement.

3. A resilient wheel, including a hub portion, a resilient cushion mounted on the periphery thereof, an intermediate member having a rim engaging the cushion and side plates secured to each side of the rim engaging the hub portion for holding the rim in fixed axial relation therewith and having portions extending beyond the rim, an outer rim having portions extending between the side plates of the intermediate member, and means for mounting the outer rim on the intermediate rim located between the side plates and the portions of the outer rim between said plates, said means permitting axial movement of the outer rim relative to the intermediate member.

4. A resilient wheel, including a hub portion, a resilient cushion mounted on the periphery thereof, an intermediate member having a rim engaging the cushion and side plates secured to each side of the rim engaging the hub portion for holding the rim in fixed axial relation therewith and having portions extending beyond the rim, an outer rim having portions extending between the side plates of the intermediate member, and resilient means between the extending portions of the side plates and the portions of the outer rim for permitting relative axial movement of the outer rim on the intermediate member and cushioning said movement.

5. A resilient wheel, including a hub portion, a resilient cushion mounted on the periphery thereof, an intermediate member composed of an annular rim mounted on the cushion and side plates secured thereto at the edges having portions engaging the hub portion of the wheel and portions projecting outwardly beyond the rim, an annular ring slidably mounted on the rim having flanges upstanding therefrom, an outer rim having spokes extending between and secured to said flanges and ring, and resilient means between the extending portions of said side plates and the flanges, permitting a relative axial movement of the outer rim with respect to the intermediate member and cushioning said movement.

6. A resilient wheel, including a hub portion, a resilient cushion mounted on the periphery thereof, an intermediate member composed of an annular rim mounted on the cushion and side plates secured thereto at the edges having portions engaging the hub portion of the wheel and portions projecting outwardly beyond the rim, an annular ring slidably mounted on the rim having flanges upstanding therefrom, keys mounted on the ring sliding in keyways formed in the rim for preventing any relative rotation between the rim and ring, an outer rim having spokes extending between and secured to said flanges and ring, and resilient means between the extending portions of said side plates and the flanges, permitting a relative axial movement of the outer rim with respect to the intermediate member and cushioning said movement.

7. A resilient wheel, including a hub portion, an inner rim having a web connecting it with the hub portion, said web being formed with a plurality of radial slots, a resilient cushion mounted on the inner rim, an intermediate member composed of a rim mounted on the cushion and side plates carried thereby extending inwardly engaging the web and formed with a plurality of slots corresponding in number with the radial slots registering therewith and disposed at right angles thereto, a bar movably mounted in each radial slot and the respective slots in the side plates providing a driving connection between the hub and intermediate member, and an outer rim mounted on said intermediate member.

8. A resilient wheel, including a hub portion, an inner rim having a web connecting it with the hub portion, said web being formed with a plurality of radial slots, a resilient cushion mounted on the inner rim, an intermediate member composed of a rim mounted on the cushion and side plates carried thereby extending inwardly, adjacent the web and formed with a plurality of slots corresponding in number with the radial slots, registering therewith and disposed at right angles thereto, wear receiving elements mounted in the web and side plates contacting to provide a sliding joint for preventing axial movement of the intermediate member on the hub portion, a bar movably mounted in each radial slot and the respective slots in the side plates providing a driving connection between the hub and intermediate member, and an outer rim mounted on said intermediate member.

In testimony whereof he hereunto affixed his signature in the presence of two witnesses.

VICENTE GIL-DELGADO.

Witnesses:
 ALFONSO SOPER,
 MANUEL MARBEY.